United States Patent Office 3,325,497
Patented June 13, 1967

3,325,497
CYCLOHEPTATRIENYLPIPERAZINES
Jean Clement Louis Fouche, Bourg-la-Reine, Seine, France, assignor to Rhone-Poulenc S.A., Paris, France, a French body corporate
No Drawing. Filed Mar. 23, 1966, Ser. No. 536,670
Claims priority, application France, Mar. 26, 1965, 10,909; Feb. 17, 1966, 50,025
14 Claims. (Cl. 260—268)

This invention relates to dibenzocycloheptatriene derivatives and their preparation.

The present invention provides, as new compounds the dibenzo[a,d]cycloheptatriene derivatives of the formula:

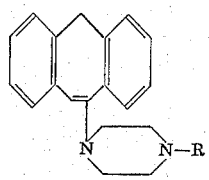

and their acid addition salts and quaternary ammonium derivatives, in which R is hydrogen, alkyl of up to 5 carbon atoms, alkenyl of 2 to 5 carbon atoms, alkynyl of 2 to 5 carbon atoms, hydroxyalkyl of up to 5 carbon atoms, hydroxyalkoxyalkyl in which each alkyl residue contains up to 5 carbon atoms, alkanoyl of up to 6 carbon atoms, phenylalkyl of 7 to 12 carbon atoms, or phenylalkyl of 7 to 12 carbon atoms substituted by one or more alkyl or alkoxy radicals of up to 5 carbon atoms, and the carbon atoms of the piperazine nucleus may be substituted by one or more methyl radicals.

In accordance with a feature of the invention, the compounds of Formula I in which R is free from active hydrogen are prepared by reacting an ester of the formula:

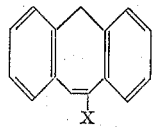

in which X represents a reactive ester residue, such as a halogen atom or a sulphuric or sulphonic ester residue (for example a methane-sulphonyloxy or toluene-p-sulphonyloxy residue) with a piperazine derivative, optionally prepared in situ, of the formula:

in which Y is an alkali metal or Hal—Mg— (where Hal is halogen) and $R^1$ is a radical within the definition of R but free from active hydrogen, and the carbon atoms of the piperazine nucleus may be substituted by one or more methyl radicals.

When Y is an alkali metal, it is advantageous to operate in an inert organic solvent such as an ether (diethyl ether or tetrahydrofuran), preferably at the boiling temperature of the solvent, and to use the lithium derivative as the piperazine derivative of Formula III.

When Y is Hal—Mg—, the reaction should be effected in hexamethylphosphotriamide. Halomagnesium derivatives of Formula III may be prepared by reacting methyl magnesium iodide with a piperazine of the formula:

in which $R^1$ is as hereinbefore defined, and the carbon atoms of the piperazine nucleus may be substituted by one or more methyl radicals, the operation being carried out in hexamethylphosphotriamide.

A compound of Formula I in which R is hydrogen is prepared, in accordance with the invention, by hydrolysis of a compound of Formula I in which R is alkanoyl, especially formyl or acetyl, preferably by heating the latter compound in aqueous organic alkaline solution.

The compounds of Formula I in which R is other than hydrogen or alkanoyl are prepared, in accordance with the invention by reacting a 10-(1-piperazinyl)dibenzo[a,d]cycloheptatriene of the formula:

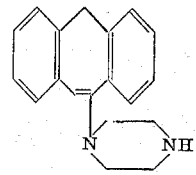

in which the carbon atoms of the piperazine nucleus may be substituted by one or more methyl radicals with an ester of the formula:

$$R^2-X$$

in which $R^2$ is a radical within the definition of R other than hydrogen or alkanoyl and X is as hereinbefore defined.

The condensation is preferably carried out in an inert organic solvent such as an aromatic hydrocarbon (benzene or xylene) or an amide (dimethylformamide). It is particularly advantageous to operate at the boiling temperature of the solvent in the presence of an alkaline condensing agent.

Where a base of Formula I is produced by one of the aforesaid processes, it may, if desired, be converted into an acid addition salt or quaternary ammonium derivative thereof. The addition salts may be obtained by the action of the bases of Formula I on acids in appropriate solvents such as alcohols, ethers, ketones or chlorinated solvents. The salt formed precipitates, if necessary after concentration of the solution, and is separated by filtration or decantation. The quaternary ammonium salts may be obtained by the action of the tertiary bases of Formula I on esters, where necessary in an organic solvent at room temperature or, more rapidly, with moderate heating.

The compounds of Formula I may be purified by physical methods (such as distillation, crystallisation or chromatography) or by chemical methods (such as salt formation, crystallisation of the salt, followed by decomposition in an alkaline medium. In these operations, the nature of the anion of the salt is immaterial, the only condition being that the salt must be well-defined and readily crystallisable).

The new compounds, both as bases and as acid addition salts and quaternary ammonium derivatives, have interesting pharmacodynamic properties. They are very active on the central nervous system, more especially as neuroleptics. They also have good antihistaminic, antiserotonin and analgesic activity. Of these compounds, 10-(4-methyl-1-piperazinyl)dibenzo[a,b]cycloheptatriene has proved particularly useful.

For medicinal use, the new compounds are employed either in the form of the bases or in the form of pharmaceutically acceptable acid addition salts or quaternary ammonium derivatives, i.e. those which are not toxic in the doses in which they are used. Examples of pharmaceutically acceptable addition salts includes salts of mineral acids (such as hydrochlorides, sulphates, nitrates and phosphates) and salts of oragnic acids (such as acetates, propionates, succinates, benzoates, fumarates, maleates, theophyllineacetates, salicylates, phenolphthaleinates and methylene-bis-β-oxynaphthoates), and derivatives of these acids. Examples of pharmaceutically acceptable quaternary ammonium derivatives include those made with mineral or organic esters such as methyl, ethyl, allyl and benzyl chloride, bromide and iodide, methyl and ethyl sulphates and benzenesulphonates, and derivatives of these esters.

The following examples illustrate the invention.

*Example 1*

To a suspension of 15.75 g. of lithium, cut into small pieces, in 600 cc. of anhydrous diethyl ether, are added in 45 minutes at —20° C. 123 g. of n-butyl bromide in solution in 600 cc. of anhydrous diethyl ether. The reaction is allowed to continue for 2 hours at —20° C. and then for 1 hour at 0° C. The lithium which remains in suspension is filtered off and 90 g. of 1-methyl-piperazine dissolved in 100 cc. of anhydrous diethyl ether are added in 20 minutes to the solution of butyl-lithium in ether obtained, with cooling in an ice bath. A suspension of the lithium derivative of 1-methylpiperazine forms, and is allowed to warm up to 20° C. A solution of 48.8 g. of 10-bromodibenzo[a,d]cycloheptatriene in 350 cc. of anhydrous diethyl ether is added without cooling, in 5 minutes. The temperature rises to 32° C. at the end of the addition. The reaction mixture is heated under reflux for 4 hours and then cooled in an ice bath. 250 cc. of distilled water are added. The ethereal solution is decanted, washed to neutrality with distilled water, dried over anhydrous potassium carbonate and evaporated. The oily residue (48.5 g.) is dissolved in 150 cc. of anhydrous ethanol and treated with 40 cc. of an anhydrous solution of hydrogen chloride in ethanol (containing 4.5 mol. of hydrogen chloride per litre of solution). After cooling at 5° C. for 1 hour 30 minutes, the crystals which have appeared are separated, washed three times with a total of 25 cc. of ice-cold anhydrous ethanol, and dried under reduced pressure (about 20 mm. Hg). The dry hydrochloride obtained (32.9 g.) is poured into 500 cc. of N sodium hydroxide solution in the presence of 750 cc. of pure diethyl ether. The ethereal solution is decanted, washed four times with a total of 800 cc. of distilled water, dried over anhydrous potassium carbonate, and evaporated. The crystalline residue obtained is dissolved in 110 cc. of boiling acetonitrile. After cooling for 17 hours at 3° C., the crystals which have appeared are separated, washed twice with a total of 15 cc. of ice-cold acetonitrile and dried under reduced pressure (20 mm. Hg). 18.5 g. of 10-(4-methyl-1-piperazinyl)dibenzo[a,d]cycloheptatriene, M.P. 133–135° C., are obtained.

To a solution of 12.0 g. of 10-(4-methyl-1-piperazinyl)dibenzo[a,d]cycloheptatriene in 170 cc. of boiling ethanol, 2.8 g. of tartaric acid dissolved in 50 cc. of boiling ethanol are added. After cooling at 3° C. for 17 hours, the crystals which have appeared are separated, washed four times with a total of 32 cc. of ice-cold ethanol, and dried at room temperature under reduced pressure (20 mm. Hg). 14.1 g. of the neutral tartrate of 10-(4-methyl-1-piperazinyl)dibenzo[a,d]cycloheptatriene, M.P. about 180° C., containing 6% of ethanol, are obtained.

The 10-bromodibenzo[a,d]cycloheptatriene used as starting material is prepared by the action of potassium hydroxide on 10,11-dibromodibenzo[a,d]cycloheptadiene in dioxane at 35–40° C. for 17 hours. The crude oily product obtained is used as such. 10,11-dibromodibenzo[a,d]cycloheptadiene, M.P. about 180° C., is prepared by the action of bromine on dibenzo[a,d]cycloheptatriene, in accordance with the method of Treibs et al., Chem. Ber. 84, 679 (1951).

*Example 2*

To a suspension of 8.4 g. of lithium, cut into small pieces, in 300 cc. of anhydrous diethyl ether, 66.0 g. of n-butyl bromide dissolved in 300 cc. of anhydrous diethyl ether are added at —20° C. in 35 minutes. The reaction is allowed to continue for two hours at —20° C. and then for one hour at 0° C. The lithium remaining in suspension is filtered off and, to the solution of butyl-lithium in ether obtained, 54.6 g. of 1-ethylpiperazine in solution in 90 cc. of anhydrous diethyl ether are added in 20 minutes with cooling in an ice bath. A suspension of the lithium derivative of 1-ethylpiperazine forms, and is allowed to warm up to 20° C. A solution of 32.5 g. of 10-bromodibenzo[a,d]cycloheptatriene in 120 cc. of anhydrous diethyl ether is added without cooling in 5 minutes. The temperature rises to 32° C. at the end of the addition. The reaction mixture is heated under reflux for four hours and then cooled in an ice bath, and 400 cc. of distilled water are added. The ethereal solution is decanted, washed eight times with a total of 1600 cc. of distilled water, dried over anhydrous potassium carbonate and evaporated. The oily residue obtained (36.0 g.) is dissolved in 80 cc. of anhydrous ethanol and treated with 30 cc. of an anhydrous solution of hydrogen chloride in ethanol (containing 4.5 mol. of hydrogen chloride per litre of solution). After cooling at 3° C. for two hours, the crystals which have appeared are separated, washed three times with a total of 15 cc. of ice-cold ethanol, and dried under reduced pressure (20 mm. Hg). The dry hydrochloride obtained (17.0 g.) is treated with 750 cc. of N sodium hydroxide solution and 600 cc. of diethyl ether. The decanted ethereal solution is washed four times with a total of 400 cc. of distilled water, dried over anhydrous potassium carbonate and evaporated. The residue obtained (15.5 g.) is dissolved in 100 cc. of boiling ethanol and treated with 4.35 g. of tartaric acid in solution in 80 cc. of boiling ethanol. After cooling at 3° C. for five hours, the crystals which have appeared are separated, washed three times with a total of 15 cc. of ethanol and dried under reduced pressure (20 mm. Hg). The tartrate obtained (16.0 g.) is treated with 500 cc. of N sodium hydroxide solution and 500 cc. of diethyl ether. The ethereal solution is decanted, washed four times with a total of 400 cc. of distilled water, dried over anhydrous potassium carbonate and evaporated. The oily residue obtained (13.0 g.) is dissolved in 50 cc. of boiling ethanol and treated with 4.95 g. of fumaric acid in solution in 50 cc. of boiling ethanol. After cooling at 3° C. for 90 minutes, the crystals which have appeared are separated, washed three times with a total of 15 cc. of ice-cold ethanol and dried under reduced pressure (20 mm. Hg). 14.0 g. of 10-(4-ethyl-1-piperazinyl)dibenzo[a,d]cycloheptatriene fumarate, M.P. about 210–220° C., are obtained.

*Example 3*

To a solution of butyl-lithium (prepared as in Example 2 from 4.2 g. of lithium, 33.0 g. of butyl bromide and 300 cc. of anhydrous diethyl ether) 42.3 g. of 1-benzylpiperazine dissolved in 45 cc. of anhydrous diethyl ether are added. After two hours at ambient temperature (20° C.), 16.3 g. of 10-bromodibenzo[a,d]cycloheptatriene dissolved in 75 cc. of anhydrous diethyl ether are added to the product obtained. The temperature rises to 33° C. The reaction mixture is then heated under reflux for four hours and cooled, and 300 cc. of distilled water are added. The decanted ethereal solution is washed seven times with a total of 500 cc. of distilled water, dried over anhydrous potassium carbonate, and evaporated. The residue (27.4 g.) is treated with 30 cc. of boiling ethyl acetate. After cooling at 3° C. for two hours, the crystals which have appeared are separated, washed three times with a total of 12 cc. of ice-cold ethyl acetate, and dried under reduced pressure (20 mm. Hg). 6.9 g. of 10-(4-benzyl-1-piperazinyl)dibenzo[a,d]cycloheptatriene, M.P. 178–180° C., are obtained.

*Example 4*

To a methyl-magnesium iodide solution (prepared from 90.0 g. of magnesium turnings, 540 g. of methyl iodide and 1200 cc. of anhydrous diethyl ether) 750 g. of hexamethylphosphotriamide are added, and then, while the temperature is kept between 25° and 30° C., 750 g. of 1-methylpiperazine in solution in 750 cc. of hexamethylphosphotriamide and 203 g. of 10-bromodibenzo[a,d]cycloheptatriene dissolved in 1075 g. of hexamethylphosphotriamide are successively added in 30 minutes. The mixture is heated for two hours at 50° C. After cooling, 3000 cc. of diethyl ether, 9000 cc. of distilled water and 3000 g. of ammonium chloride are added. The decanted aqueous solution is twice extracted with a total of 3000 cc. of diethyl ether. The combined ethereal solutions are washed ten times with a total of 10,000 cc. of distilled water, dried over potassium carbonate and evaporated. The crystalline residue obtained (210 g.) is dissolved in 525 cc. of anhydrous ethanol. The solution obtained is treated with an excess of gaseous anhydrous hydrogen chloride. After cooling at 5° C. for two hours, the crystals which have appeared are separated, washed three times with 150 cc. of anhydrous ethanol and dried under reduced pressure (20 mm. Hg). The crude hydrochloride obtained (169 g.) is treated with 2000 cc. of N sodium hydroxide solution and 2500 cc. of diethyl ether. The decanted aqueous solution is washed with 750 cc. of diethyl ether. The combined ethereal solutions are washed five times with a total of 1250 cc. of distilled water, dried over anhydrous potassium carbonate and evaporated. The residue obtained (150 g.) is dissolved in 630 cc. of boiling acetonitrile, treated with 3 g. of charcoal, and filtered hot. After cooling at 3° C. for three hours, the crystals which have appeared are separated, washed three times with a total of 150 cc. of ice-cold acetonitrile, and dried under reduced pressure (20 mm. Hg). 109 g. of 10-(4-methyl-1-piperazinyl)dibenzo[a,d]cycloheptatriene, M.P. 133–135° C., are obtained.

*Example 5*

To a methyl-magnesium iodide solution (prepared from 5.6 g. of magnesium, 95 cc. of anhydrous diethyl ether and 33.5 g. of methyl iodide) 50 g. of hexamethylphosphotriamide and then, in 20 minutes, 53.3 g. of 1-formyl-piperazine dissolved in 50 g. of hexamethylphosphotriamide are added. 12.7 g. of 10-bromodibenzo[a,d]cycloheptatriene dissolved in 75 g. of hexamethylphosphotriamide are added to the suspension obtained. The diethyl ether is removed by distillation and the reaction mixture is heated at 120° C. for 10 hours. After cooling, the mixture is treated with 300 cc. of diethyl ether, 1000 cc. of distilled water and 200 g. of ammonium chloride. The aqueous solution is twice extracted with a total of 600 cc. of diethyl ether. The combined ethereal solutions are washed ten times with a total of 1000 cc. of distilled water, dried over anhydrous potassium carbonate and concentrated. The oily residue (12.2 g.) of 10-(4-formyl-1-piperazinyl)dibenzo[a,d]cycloheptatriene obtained is treated with 230 cc. of ethanol and 100 cc. of 2 N sodium hydroxide solution. The reaction mixture is heated under reflux for two hours. The ethanol is then evaporated and the residue is dissolved in 500 cc. of diethyl ether. The decanted aqueous solution is twice extracted with a total of 300 cc. of diethyl ether. The combined ethereal solutions are washed ten times with a total of 750 cc. of distilled water and dried over anhydrous potassium carbonate. The residue obtained (10.7 g.) after removal of the ether is dissolved in 15 cc. of boiling ethanol and treated with 4.5 g. of fumaric acid dissolved in 30 cc. of boiling ethanol. After cooling to 20° C., 5 cc. of anhydrous diethyl ether are added. The solution obtained is cooled at 3° C. for 5 hours. The crystals which have appeared are separated, washed three times with 9 cc. of ice-cold ethanol and dried under reduced pressure (20 mm. Hg). 8.8 g. of 10-(1-piperazinyl)dibenzo[a,d]cycloheptatriene fumarate, M.P. about 260° C., are obtained. By treatment with sodium hydroxide and extraction with diethyl ether, 10-(1-piperazinyl)dibenzo[a,d]cycloheptatriene is obtained, which, when recrystallised from di-isopropyl ether, melts at 118–119° C.

*Example 6*

A mixture of 1.00 g. of 10-(1-piperazinyl)dibenzo[a,d]cycloheptatriene, 0.45 g. of n-propyl bromide, 0.61 g. of sodium bicarbonate and 30 cc. of dimethylformamide is heated under the reflux for five hours. After cooling, the reaction product is treated with 250 cc. of distilled water, 25 cc. of 2 N sodium hydroxide solution and 150 cc. of diethyl ether. The decanted aqueous solution is twice extracted with a total of 200 cc. of diethyl ether. The combined ethereal solutions are washed ten times with a total of 250 cc. of distilled water, dried over anhydrous potassium carbonate and evaporated. The residue obtained (1.08 g.) is dissolved in 3.0 cc. of boiling ethanol and treated with 0.29 g. of fumaric acid in 5.0 cc. of boiling ethanol. After cooling at 3° C. for 4 hours, the crystals which have appeared are separated, washed with 1.5 cc. of ice-cold ethanol and dried under reduced pressure (20 mm. Hg). 0.80 g. of 10-(4-n-propyl-1-piperazinyl)dibenzo[a,d]cycloheptatriene fumarate is obtained, M.P. 193–197° C.

*Example 7*

A mixture of 1.00 g. of 10-(1-piperazinyl)dibenzo[a,d]cycloheptatriene, 0.29 g. of ethylene glycol chlorhydrin, 0.61 g. of sodium bicarbonate and 30 cc. of dimethylformamide is heated under reflux for 5 hours. After cooling, the reaction mixture is treated with 250 cc. of distilled water, 25 cc. of 2 N sodium hydroxide solution and 150 cc. of diethyl ether. The decanted aqueous solution is twice extracted with a total of 200 cc. of diethyl ether. The combined ethereal solutions are twice washed with a total of 250 cc. of distilled water, dried over anhydrous potassium carbonate and evaporated. The residue obtained (1.00 g.) is dissolved in 6.0 cc. of boiling di-isopropyl ether and 1.0 cc. of acetonitrile is then added. After cooling at 3° C. for 17 hours, the crystals which have appeared are separated, washed with 1.0 cc. of ice-cold di-isopropyl ether and dried under reduced pressure (20 mm. Hg). 0.45 g. of 10-[4-(2-hydroxyethyl)-1-piperazinyl]dibenzo[a,d]cycloheptatriene, M.P. 99–101° C. is obtained.

*Example 8*

A mixture of 1 g. of 10-(1-piperazinyl)-dibenzo[a,d]cycloheptatriene, 0.45 g. of 2-(2-chloroethoxy)ethanol, 0.61 g. of sodium bicarbonate and 30 cc. of dimethylformamide is heated under reflux for 5 hours. After cooling, the reaction mixture is treated with 250 cc. of distilled water, 25 cc. of 2 N sodium hydroxide solution and 150 cc. of diethyl ether. The decanted aqueous solution is twice extracted with a total of 200 cc. of diethyl ether. The combined ethereal solutions are washed ten times with a total of 300 cc. of distilled water, dried over anhydrous sodium carbonate and evaporated. The residue obtained (1.15 g.) is dissolved in 3.5 cc. of boiling ethanol and treated with 0.37 g. of fumaric acid dissolved in 6.0 cc. of boiling ethanol. After cooling at 3° C. for 5 hours, the crystals which have appeared are separated, washed with 1.5 cc. of ice-cold ethanol and dried under reduced pressure (20 mm. Hg). 10-[4-(2'-hydroxy-2-ethoxyethyl)-1-piperazinyl]dibenzo[a,d]cycloheptatriene fumarate (1.22 g.), M.P. about 105° C., is obtained.

*Example 9*

A mixture of 1.00 g. of 10-(1-piperazinyl)dibenzo[a,d]cycloheptatriene, 0.28 g. of allyl chloride, 0.61 g. of sodium bicarbonate and 30 cc. of dimethylformamide is heated at 60° C. for 15 hours. After cooling, the reaction mixture is treated with 250 cc. of distilled water, 25 cc. of 2 N sodium hydroxide solution and 150 cc. of diethyl ether. The decanted aqueous solution is twice extracted with a total of 200 cc. of diethyl ether. The combined ethereal solutions are washed ten times with a total of 300 cc. of distilled water, dried over anhydrous potassium carbonate and evaporated. The residue obtained (1.05 g.) is dissolved in 4.0 cc. of boiling ethanol and treated with 0.38 g. of fumaric acid dissolved in 6.0 cc. of boiling ethanol. After cooling at 3° C. for 5 hours, the crystals which have appeared are separated, washed with 2.0 cc. of ice-cold ethanol and dried under reduced pressure (20 mm. Hg). 10-(4-allyl-1-piperazinyl)dibenzo[a,d]cycloheptatriene fumarate (1.23 g.), M.P. 188–192° C. is obtained.

Example 10

A mixture of 1.00 g. of 10-(1-piperazinyl)dibenzo[a,d]cycloheptatriene, 0.27 g. of 2-propynyl chloride, 0.61 g. of sodium bicarbonate and 30 cc. of dimethylformamide is heated at 60° C. for 15 hours. After cooling, the reaction mixture is treated with 250 cc. of distilled water, 25 cc. of 2 N sodium hydroxide solution and 150 cc. of diethyl ether. The decanted aqueous solutions is twice extracted with a total of 200 cc. of diethyl ether. The combined ethereal solutions are washed ten times with a total of 300 cc. of distilled water, dried over anhydrous potassium carbonate and evaporated. The residue obtained (1.10 g.) is dissolved in 5.0 cc. of boiling acetonitrile. After cooling at 3° C. for 5 hours, the crystals which have appeared are separated, washed with 2.0 cc. of ice-cold acetonitrile and dried under reduced pressure (20 mm. Hg). 0.85 g. of 10-[4-(2-propynyl)-1-piperazinyl]dibenzo[a,d]cycloheptatriene, M.P. 139–140° C., is obtained.

Example 11

A mixture of 1.00 g. of 10-(1-piperazinyl)dibenzo[a,d]cycloheptatriene, 0.73 g. of 4-methoxybenzylbromide, 0.61 g. of sodium bicarbonate and 30 cc. of dimethylformamide is heated under reflux for 5 hours. After cooling, the reaction mixture is treated with 250 cc. of distilled water, 25 cc. of 2 N sodium hydroxide solution and 150 cc. of diethyl ether. The decanted aqueous solution is twice extracted with a total of 200 cc. of diethyl ether. The combined ethereal solutions are washed ten times with a total of 300 cc. of distilled water, dried over anhydrous potassium carbonate and evaporated. The residue (1.72 g.) is dissolved in 3.0 cc. of boiling ethanol and treated with 5.0 g. of fumaric acid dissolved in 7.0 cc. of boiling ethanol. After cooling for 5 hours at 3° C., the crystals which have appeared are separated, washed with 1.5 cc. of ice-cold ethanol and dried under reduced pressure (20 mm. Hg). 10-[4-(4-methoxybenzyl)-1-piperazinyl]dibenzo[a,d]cycloheptatriene fumarate, (1.57 g.) M.P. about 160° C., is obtained.

The present invention includes within its scope pharmaceutical compositions containing, as active ingredients, at least one of the dibenzo cycloheptatriene derivatives of Formula I, or of a pharmaceutically acceptable acid addition salt or quaternary ammonium derivative thereof, in association with a pharmaceutical carrier or coating. The invention includes especially such preparations made up for oral, parenteral or rectal administration.

Solid compositions for oral administration include tablets, pills, powders, and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions, or emulsions. Examples of non-aqueous solvents or vehicles are propylene glycol, polyethylene glycol, vegetable oils, such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which may contain, in addition to the active substance, excipients such as cacao butter or a suitable wax base.

The percentage of active ingredient in the compositions of the invention may be varied, it being necessary that it should constitute a proportion such that a suitable dosage shall be obtained. Ordinarily the compositions contain from 5 to 95% by weight of active ingredient. The dosage depends on the desired therapeutic effect, on the route of administration and on the duration of the treatment. In human therapy the compositions should generally be administered orally so as to give between 0.1 and 50 mg. of active substance per day.

The following example illustrates pharmaceutical compositions according to the invention.

Example 12

Tablets are prepared in the usual way, having the following composition:

| | Mg. |
|---|---|
| 10-(4-methyl-1-piperazinyl)dibenzo[a,d]cycloheptatriene maleate | 2.8 |
| Starch | 110 |
| Colloidal silica | 35 |
| Magnesium stearate | 2.2 |

I claim:

1. A member selected from the group consisting of a dibenzocycloheptatriene derivative of the formula:

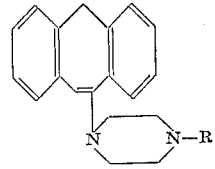

and its non-toxic acid addition salts and quaternary ammonium derivatives, in which R is hydrogen, alkyl of up to 5 carbon atoms, alkenyl of 2 to 5 carbon atoms, alkynyl of 2 to 5 carbon atoms, hydroxyalkyl of up to 5 carbon atoms, hydroxyalkoxyalkyl in which each alkyl residue contains up to 5 carbon atoms, alkanoyl of up to 6 carbon atoms, phenylalkyl of 7 to 12 carbon atoms, or phenylalkyl of 7 to 12 carbon atoms substituted by one or more alkyl or alkoxy radicals of up to 5 carbon atoms.

2. A dibenzocycloheptatriene derivative as claimed in claim 1, in which R is hydrogen, alkyl of up to 5 carbon atoms, hydroxyalkyl of up to 5 carbon atoms, or phenylalkyl of 7 to 12 carbon atoms.

3. A member selected from the group consisting of the dibenzo[a,d]cycloheptatriene claimed in claim 1 in which R is methyl and its non-toxic acid addition salts and quaternary ammonium derivatives.

4. A member selected from the group consisting of the dibenzo[a,d]cycloheptatriene claimed in claim 1 in which R is ethyl and its non-toxic acid addition salts and quaternary ammonium derivatives.

5. A member selected from the group consisting of the dibenzo[a,d]cycloheptatriene claimed in claim 1 in which R is benzyl and its non-toxic acid addition salts and quaternary ammonium derivatives.

6. A member selected from the group consisting of the dibenzo[a,d]cycloheptatriene claimed in claim 1 in which R is formyl and its non-toxic acid addition salts and quaternary ammonium derivatives.

7. A member selected from the group consisting of the dibenzo[a,d]cycloheptatriene claimed in claim 1 in which R is hydrogen and its non-toxic acid addition salts and quaternary ammonium derivatives.

8. A member selected from the group consisting of the dibenzo[a,d]cycloheptatriene claimed in claim 1 in which R is n-propyl and its non-toxic acid addition salts and quaternary ammonium derivatives.

9. A member selected from the group consisting of the dibenzo[a,d]cycloheptatriene claimed in claim 1 in which R is 2-hydroxyethyl and its non-toxic acid addition salts and quaternary ammonium derivatives.

10. A member selected from the group consisting of the dibenzo[a,d]cycloheptatriene claimed in claim 1 in which R is 2'-hydroxy-2-ethoxyethyl and its non-toxic acid addition salts and quaternary ammonium derivatives.

11. A member selected from the group consisting of the dibenzo[a,d]cycloheptatriene claimed in claim 1 in which R is allyl and its non-toxic acid addition salts and quaternary ammonium derivatives.

12. A member selected from the group consisting of the dibenzo[a,d]cycloheptatriene claimed in claim 1 in which R is 2-propynyl and its non-toxic acid addition salts and quaternary ammonium derivatives.

13. A member selected from the group consisting of the dibenzo[a,d]cycloheptatriene claimed in claim 1 in which R is 4-methoxybenzyl and its acid addition salts and quaternary ammonium derivatives.

14. A member selected from the group consisting of a non-toxic acid addition salt or quaternary ammonium derivative of a dibenzocycloheptatriene derivative as claimed in claim 2.

No references cited.

ALEX MAZEL, *Primary Examiner.*

H. R. JILES, *Assistant Examiner.*